No. 869,756. PATENTED OCT. 29, 1907.
A. D. ULERY.
COMBINATION HARROW, PULVERIZER, AND DRAG.
APPLICATION FILED APR. 23, 1907.
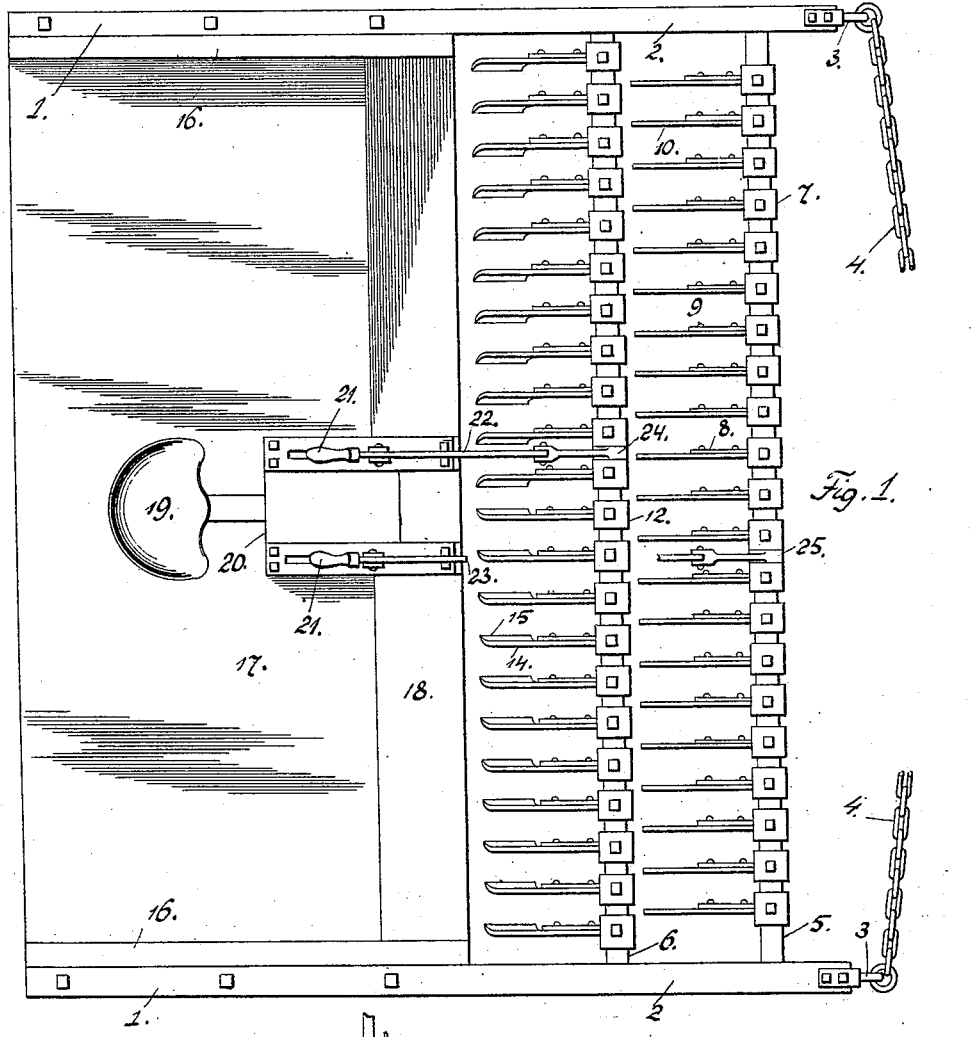

UNITED STATES PATENT OFFICE.

ARTHUR D. ULERY, OF SCENERY HILL, PENNSYLVANIA.

COMBINATION HARROW, PULVERIZER, AND DRAG.

No. 869,756.  Specification of Letters Patent.  Patented Oct. 29, 1907.

Application filed April 23, 1907. Serial No. 369,849.

*To all whom it may concern:*

Be it known that I, ARTHUR D. ULERY, a citizen of the United States of America, residing at Scenery Hill, in the county of Washington and State of Pennsylvania, have invented certain new and useful Improvements in a Combination Harrow, Pulverizer, and Drag, of which the following is a specification, reference being had therein to the accompanying drawing.

This invention relates to a combination harrow, pulverizer and drag, and the invention has for its object to provide a novel implement for tilling and treating soil, the implement accomplishing the work of three implements, thus reducing the labor and time ordinarily consumed in preparing a piece of ground for seed.

Another object of this invention is to provide a simple and inexpensive implement of less draft than the ordinary harrow, the implement disintegrating the soil as thoroughly as a harrow, and at the same time leveling and filling up depressions of uneven plowed ground.

With the above and other objects in view, the invention consists in the novel construction, combination and arrangement of parts to be hereinafter more fully described and then specifically pointed out in the appended claims.

Referring to the drawing forming part of this specification, like numerals of reference designate corresponding parts throughout the several views, in which:

Figure 1 is a plan of my improved implement, and Fig. 2 is a longitudinal sectional view of the same.

To put my invention into practice, I construct my improved implement of two side frames 1 having forwardly extending beams 2. The forward ends of the beams 2 are provided with yokes 3, whereby chains 4 can be connected to said beams in order that the implement can be moved over the soil, either by a traction engine or horses. In the beams 2 are journaled transverse tubular shafts 5 and 6, and upon the shaft 5 are detachably mounted a plurality of sleeves 7, said sleeves being equally spaced and provided with arms 8. Riveted or otherwise secured to the arms 8, as at 9, are blades 10 having curved cutting edges 11.

Upon the shaft 6 are mounted a plurality of sleeves 12 having cutting blades 14, said blades being similar to the blades 10 with the exception that their ends are curved, as at 15. The sleeves 12 are equally spaced upon the shaft 6 and arranged in staggered relation to the sleeves upon the shaft 5, whereby the blades 14 will be staggered with relation to the blades 10. The blades 14 have their edges curved inwardly towards the center of the implement, so that the soil agitated by said blades will be thrown upwardly and inwardly, whereby clods of earth will be more finely disintegrated, than if the ordinary straight blades were used.

The inner sides of the frames 1 are provided with rails 16 and secured to the bottom of said rails and the bottom of the frames 1 is a transverse plate 17 having an upwardly bent forward edge 18. The plate 17 serves functionally as a drag for pulverizing and leveling soil, and this plate can be constructed of metal, or a plurality of planks can be arranged to serve functionally the same purpose. Centrally of the plate 17 is arranged a driver's seat 19, while in front of the driver's seat are placed two supports 20 for pivoted operating levers 21. The pivoted operating levers 21 are connected by links 22 and 23 with the crank arms 24 and 25 of the shafts 5 and 6. The operating levers 21 are provided with a conventional form of locking pawl 26 adapted to engage in toothed segments 27 carried by the supports 20. In this manner, the shafts 5 and 6 can be partly rotated by the operator of the implement, to raise and lower the blades 10 and 14.

In operation, the blades 10 and 14 can be positioned to treat the soil as desired, the depth of the blades within the soil being determined by the operator of the implement. The straight blades 10 are adapted to simply cut the clods and soil, while the blades 14 more finely divide the soil when they are set at a medium depth, but when lowered, the curved edges of the blades come into use, and in addition to finely cutting the soil, they turn the same and fill up depressions in the soil. Following the blades 10 and 14 is the plate 17 or the drag, which completes the operation of pulverizing and leveling the soil.

It will be apparent from the illustration of my invention that I have devised a strong and durable implement for agricultural purposes, the implement serving functionally the same purposes as a harrow, pulverizer and drag, and while I have herein described the preferred construction, I desire it to be understood that such changes in the size, proportion and minor details of construction as are permissible by the appended claims, may be resorted to without departing from the spirit and scope of the invention.

What I claim and desire to secure by Letters Patent, is:—

1. An implement of the type described consisting of side frames, forward extending beams, shafts journaled between said beams, a plurality of sleeves detachably mounted upon said shafts, the sleeves of one shaft being staggered with relation to the sleeves of the other shaft, blades carried by said sleeves, the blades of one shaft having curved edges, a plate arranged between said frames, a seat carried by said plate, operating levers pivotally supported by said plate and connecting with said shafts, and means for locking said blades in a raised or lowered position.

2. An implement of the type described consisting of beams, shafts journaled between said beams, a plurality of staggeredly arranged blades detachably supported by said shafts, some of said blades having curved edges, a plate located in the rear of said shafts, a seat carried by said plate, and operating levers arranged upon said plate for raising and lowering said blades.

3. An agricultural implement of the character described comprising longitudinally-extending beams, a plate disposed between said beams and having the forward end thereof bent upwardly, revoluble shafts journaled in the beams and arranged forwardly of said plate, a plurality of blades carried by each of said shafts, the blades carried by one shaft arranged in staggered relation with respect to the blades carried by the other shaft, certain of said blades having curved edges, and means carried by the plate and connected with the blades for elevating and lowering them.

In testimony whereof I affix my signature in the presence of two witnesses.

ARTHUR D. ULERY.

Witnesses:
ELWOOD CRUMRINE,
HELMUTH GAYMAN.